BINARY-TO-DECIMAL CONVERTER AND ADDER

Filed Jan. 12, 1953 3 Sheets-Sheet 1

INVENTORS
EUGENE L. TRIMAN
WALTER HOCHWALD
BY
William R. Lane
ATTORNEY

Feb. 2, 1960 E. L. TRIMAN ET AL 2,923,471

BINARY-TO-DECIMAL CONVERTER AND ADDER

Filed Jan. 12, 1953 3 Sheets-Sheet 2

INVENTORS
EUGENE L. TRIMAN
WALTER HOCHWALD

BY William L. Lane

ATTORNEY

BINARY-TO-DECIMAL CONVERTER AND ADDER

Filed Jan. 12, 1953

*INVENTORS*
EUGENE L. TRIMAN
WALTER HOCHWALD
*BY* William P. Lane
ATTORNEY

United States Patent Office 2,923,471

Patented Feb. 2, 1960

2,923,471

BINARY-TO-DECIMAL CONVERTER AND ADDER

Eugene L. Triman, Whittier, and Walter Hochwald, Gardena, Calif., assignors to North American Aviation, Inc.

Application January 12, 1953, Serial No. 330,722

5 Claims. (Cl. 235—155)

This invention relates to digital computing apparatus, and particularly to apparatus for converting to decimal form numbers stored in binary form in a counter made up of a series of cascaded bistable multivibrators.

A binary counter made up of a series of cascaded bistable multivibrators such as is shown in Patent Number 2,537,427 issued January 9, 1951 to Eugene Seid et al., entitled "Digital Servo," stores electrical pulses in the form of a binary number. For example, a 14-stage binary counter is capable of storing 16,384 pulses. This number if expressed in binary form, however, can be represented by the number 11111111111111. This number would be readily readable if, as is the customary practice, one-half of each bistable multivibrator were connected to light a neon bulb when that side of each bistable multivibrator conducts. Thus, if each one of the bistable multivibrator's lights is on, the counter is full, meaning that 16,384 pulses have been introduced into the counter. However, if one or more of the lights is off, the process of expressing in the decimal system the number so easily ascertainable in binary form becomes complex. This invention contemplates apparatus for readily converting to decimal form any number stored in a binary counter.

It is therefore an object of this invention to provide a digital computing device.

It is another object of this invention to provide means for converting a binary number to a decimal number.

It is another object of this invention to provide means for producing a shaft rotation proportional to the number of pulses stored in a binary counter.

It is another object of this invention to provide means for sensing at any time the number stored in a binary counter.

Other objects of invention will become apparent from the following description taken in connection with the accompanying drawings, in which Fig. 1 is a block diagram of the invention;

Figure 1:
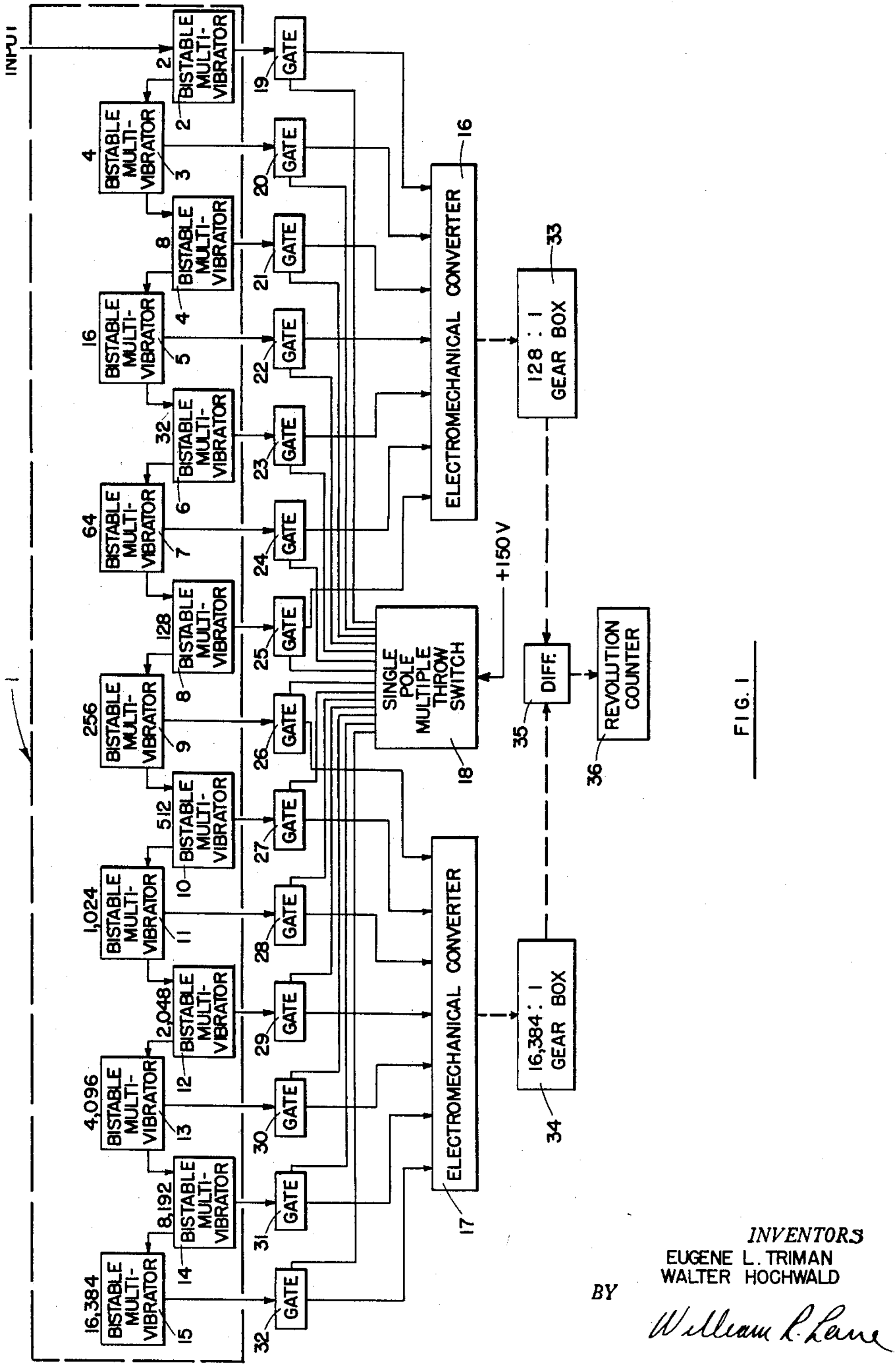

Referring to the drawings, and in particular to Fig. 1, there is shown a counter 1 including bistable multivibrators 2, 3, 4, 5, 6, 7, 8, 9, 10, 11, 12, 13, 14, and 15 connected in cascade fashion as shown. Each bistable multivibrator, by definition, has two stable states. When each bistable multivibrator is in one of its stable states denoted the "On" condition, it opens an electronic gate to which it is connected to communicate an energizing pulse to electromechanical converters 16 and 17. A single-pole multiple-throw switch 18 supplies power to gates 19, 20, 21, 22, 23, 24, 25, 26, 27, 28, 29, 30, 31, and 32, which in turn control the application thereof to electromechanical converters 16 and 17 as more completely indicated in Fig. 3. Electromechanical converters 16 and 17 have mechanical outputs which are fed to gear boxes 33 and 34, respectively, which are in turn mechanically connected to differential 35 which drives revolution counter 36.

Figure 2:
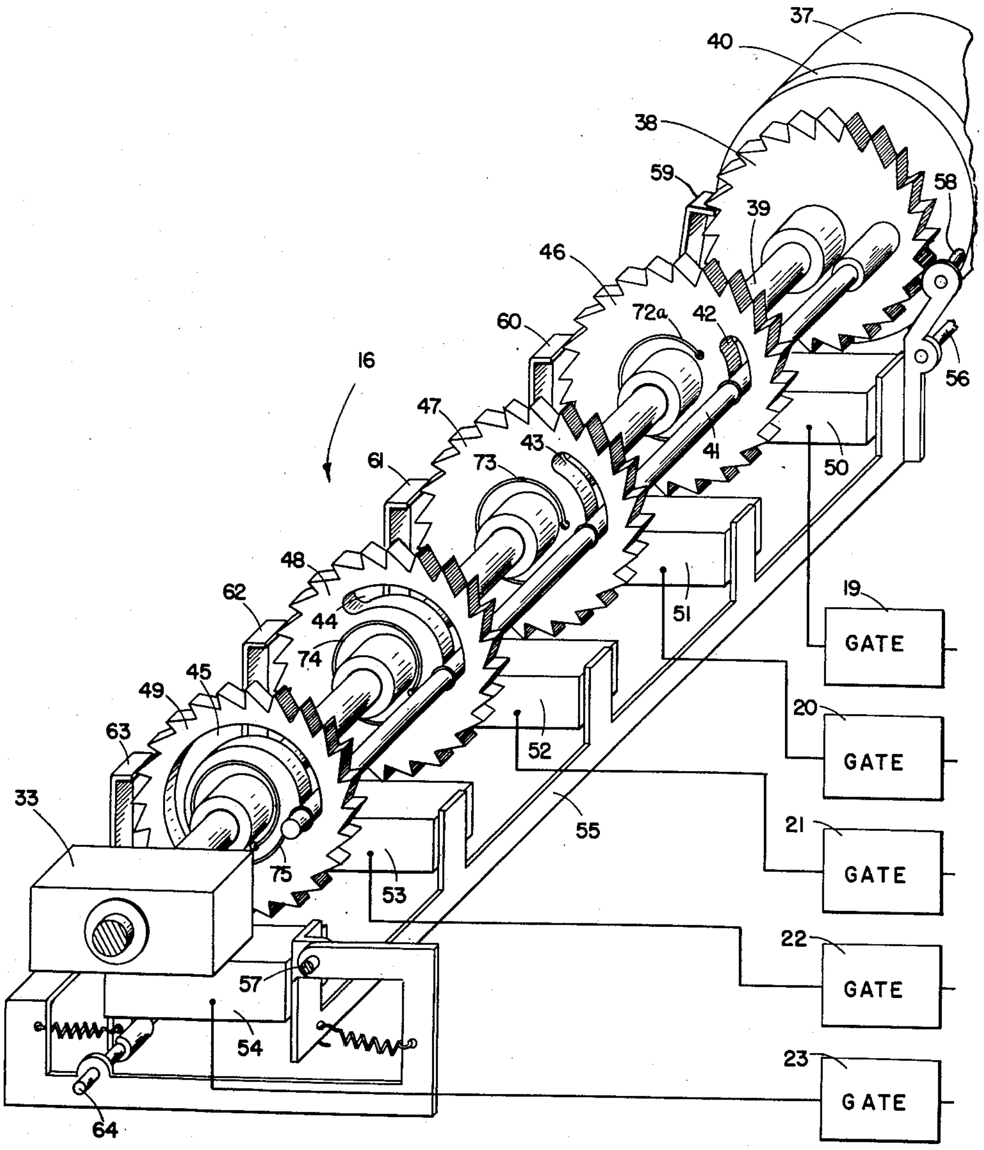
Fig. 2 is a perspective view of the converter of this invention.

Referring now to Fig. 2, a portion of electromechanical converter 16 is shown which includes rotary driving means 37 such as a spring attached to gear 38 which is integrally attached to shaft 39. Shaft 39 is supported by frame member 40. Gear 38 carries rigidly attached thereto index rod 41 which extends through slots 42, 43, 44, and 45 in gears 46, 47, 48, and 49. Gears 46, 47, 48, and 49 are free to rotate with respect to shaft 39. Solenoids 50, 51, 52, 53, and 54 are rigidly supported adjacent to gears 38, 46, 47, 48, and 49, respectively, and actuate armature 55 rotatably supported upon pins 56 and 57 and carrying pawl 58 as shown. Any one of solenoids 50, 51, 52, 53, and 54 if energized actuates armature 55. Solenoids 50, 51, 52, 53, and 54 each also actuate pivoted pawl armatures 59, 60, 61, 62, and 63, all pivoted upon fixed pivot rod 64. Shaft 39 drives gear box 33 as indicated in Fig. 1.

Figure 3:
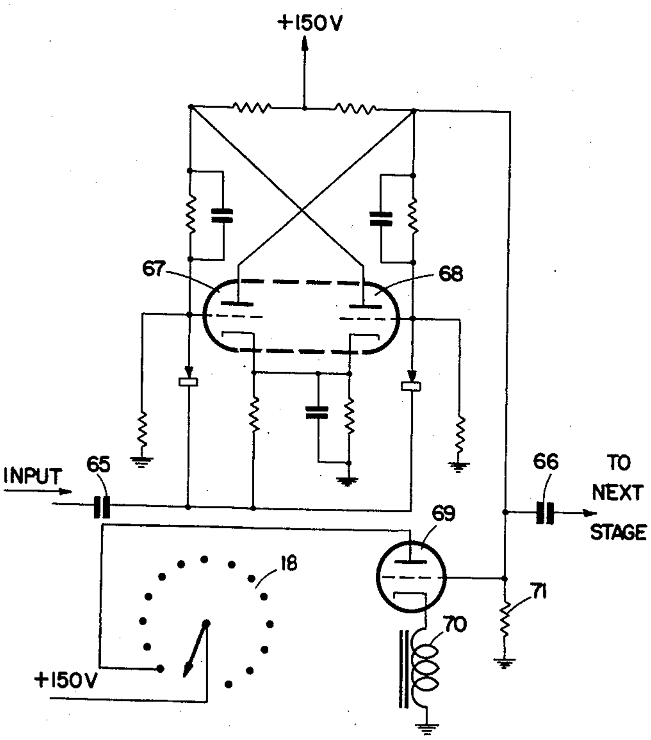
Fig. 3 is a detailed circuit diagram of a part of this invention.

Referring to Fig. 3, details of a single bistable multivibrator such as bistable multivibrator 2 are shown. This bistable multivibrator is identical to those shown in Patent Number 2,537,427 referred to above, and provides for input through condenser 65 and output through condenser 66. The bistable multivibrator, of course, is made up of two triodes 67 and 68 whose plate voltages are indicative of the stable state of the multivibrator. For instance, if the plate voltage of triode 67 is approximately equal to the plate supply voltage, no current is flowing in triode 67 and current is flowing in triode 68 so that its plate voltage is something considerably less than the plate supply voltage. The plate of triode 67 is connected to the grid of gating triode 69, which grid is biased by means of resistor 71 so that if triode 67 is conducting, triode 69 also conducts, allowing current to flow through solenoid winding 70. Plate supply voltage for triode 69 is supplied through single-pole multiple-throw switch 18.

In operation, input pulses are supplied to bistable multivibrator 2. When the first pulse is applied to bistable multivibrator 2, the multivibrator assumes the "Off" condition, and when the second pulse arrives, the bistable multivibrator assumes the "On" position. When the third pulse arrives, the device again goes to the "Off" position and a pulse is transferred to bistable multivibrator 3. Thus, bistable multivibrator 2 is capable of counting two pulses before it transfers a pulse to bistable multivibrator 3, which in turn counts two pulses from bistable multivibrator 2 before it transfers a pulse to bistable multivibrator 4. Bistable multivibrator 4 thus is capable of counting a total of eight input pulses, since bistable multivibrator 2 counts two pulses four times before bistable multivibrator 4 counts two pulses. The number of pulses which are represented by each bistable multivibrator in the counter shown in Fig. 1 is indicated adjacent to each of the bistable multivibrators. For instance, the eighth stage represents a decimal number of 256; the ninth stage a decimal number of 512; the eleventh stage a decimal number of 2048; the thirteenth stage a decimal number of 8192; and the fourteenth stage a decimal number of 16284. Assume, for example, that the binary number stored in the counter could be represented by the number 110110110. This number would mean that 512 plus 256 plus 64 plus 32 plus 8 plus 4 pulses, or 876 pulses had been applied to the input of bistable multivibrator 2. Obviously, the conversion of this binary number to its equivalent decimal number involves the addition of several numbers representing the weighting function of each particular stage of the counter. Let it be assumed that when each bistable multivibrator is in the state represented by the binary number 1, triode 67 thereof is conducting and hence gating tube 69 is conducting, allowing current to flow to solenoid 70 if switch 18 is in the appropriate position. Then, realizing that each gating tube 69 corresponds to one of gates 19 through 32 shown in Fig. 1, and that each solenoid winding 70 corresponds to a solenoid such as solenoids 50 through 54 shown in Fig. 2; and assuming that rotary driving means 37 is urging gear 38 in a counterclockwise direction, if single-pole multiple-throw switch 18 is turned from the "Off" position as shown in Fig. 3, through all its successive switch positions, current flows successively through each gating tube associated with a counter stage in the "On" condition. This current, in turn, energizes the solenoid to which it is fed, as indicated in Fig. 2. For example, since gating triode 19 is not conducting, as indicated by the last digit of the binary number contained in the counter, no energy is supplied to solenoid 50. However, the condition of bistable multivibrator 3 is represented by the binary number 1, so gate 20 is open, and solenoid 51 is energized. When solenoid 51 is energized, armature 55 is drawn toward the solenoid, releasing the engagement of pawl 58 with gear 38 and permitting rotation of gear 38. However, energization of solenoid 51 also causes rotation of pawl 60 about pivot rod 64 so that the rotation of gear 38 in a clockwise direction is limited by the width of slot 42 in gear 36, since when rod 41 reaches the end of slot 42, gear 38 ceases rotation. Gears 46, 47, 48, and 49 are spring biased by means of torsion springs **72*a*, 73, 74, and 75 so that the right ends of slots 42, 43, 44, and 45 are in contact with rod 41 except when gear 38 is rotated upon the energization of one or more of the solenoids. Slot 42 is of such a length as to correspond to two teeth of any of gears 36, or gears 46, 47, 48, or 49; while slot 43 corresponds to four such teeth, slot 44 to eight such teeth, and slot 45 to sixteen such teeth. Similar gears with similar slots corresponding to 32, 64, and 128 teeth are also carried upon shaft 39, but for convenience in presentation are not shown in Fig. 2. If the solenoids associated with these gears are connected to be energized by gates 23, 24, and 25, it can be seen that the output shaft of converter 16 is rotated 128 teeth if bistable multivibrator 8 is in "On" condition; 64 teeth if bistable multivibrator 7 is in "On" condition; and 32 teeth if bisable multivibrator 6 is in "On" condition. The provision of a single-pole multiple-throw switch 18 assures that the shaft is driven forward in response to only one of the bistable multivibrator stages at a time, since the B+ power is supplied to only one gate at a time. The output shaft of converter 16 is connected to gear box 33 which has a gear ratio of 128:1, so that the output of the gear box is 128 times the input. This output rotation is furnished to differential 35 along with the output from gear box 34. These shaft rotations are supplied in opposing senses so that the output of differential 35** is actually the numerical sum of the rotations supplied to it. The revolution counter then reads an actual number of revolutions equivalent to the number stored in the binary counter.

We have thus far considered the case where a binary number smaller than 1111111 is stored in the counter. It has also been assumed that the output shaft from gear box 34 is held in a stationary position. Revolution counter 36 therefore may be caused to read a number equal to the number stored in the first seven stages of the counter simply by traversing the first seven contacts on single-pole, multiple-throw switch 18. However, if the number stored in the counter requires more than the first seven stages thereof for its expression, as in the example above-given of the number 110110110, it is necessary to cause single-pole, multiple-throw switch 18 to traverse additional switch positions corresponding to gates 26, 27, and any other gates fed by stages of the multivibrator utilized to store pulses. Since the addition of one pulse to bistable multivibrator 9 actually corresponds to 128 pulses, and to bistable multivibrator 10, 256 pulses, and to bistable multivibrator 15, 16,384 pulses, gear box 34 is required to have a gear ratio of 16,384:1. That is, the actual displacement of the output shaft of gear box 34 is 16,384 times the actual displacement of the output shaft of converter 17. However, converter 17 may be constructed in an identical manner to converter 16 so that the gear in converter 17 corresponding to gear 46 in converter 16 need have a slot of length corresponding to only two gear teeth, and the converter gear corresponding to bistable multivibrator 15 need have only 128 teeth to perform its function, since one rotation of the shaft of converter 17 corresponds to 16,384 pulses but also corresponds to only 128 pulse inputs to bistable multivibrator 9, each pulse input to which represents 128 pulse inputs to bistable multivibrator 2. Each time single-pole, multiple-throw switch 18 traverses all its switch positions, revolution counter 36 is rotated by an amount corresponding to the number stored in the binary counter. If revolution counter 36 is not reset to zero after each traverse of the switch it can be made to perform the function of addition. When switch 18 is in the "Off" position, binary counter 1 may be cleared and may count a new number. As soon as this new number has been counted, switch 18 may be caused to traverse its various switch positions, causing an incremental rotation of revolution counter 36 corresponding to the new number in counter 1. There is thus provided a device adapted to produce a shaft rotation proportional to the number stored in the binary counter and further adapted to perform the function of addition.

Figure 4:
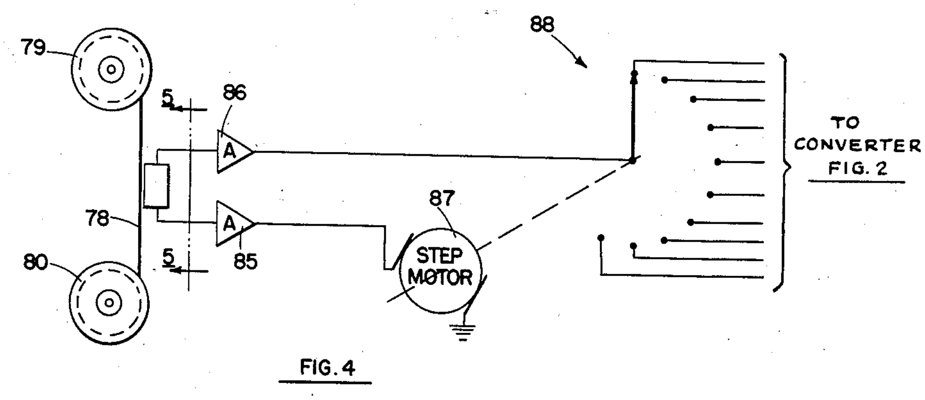
Fig. 4 is a schematic diagram of a second embodiment of the invention.
Figure 5:
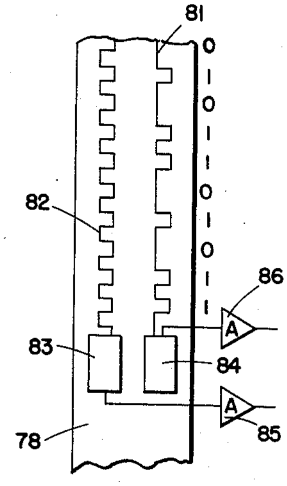
Fig. 5 is an enlarged detail taken as indicated at 5—5 in Fig. 4.

The device may further be utilized to produce a shaft rotation proportional to a many-place digital number transmitted chronologically. Referring to Figs. 4 and 5, a number represented by a ten-digit binary number is recorded as a message upon magnetic tape 78 driven by reels 79 and 80. The message corresponds to the condition of a binary counter, i.e., if the first stage of the binary counter is in "On" condition, the first pulse of the message is positive; if the first stage is not in "On" condition the first pulse does not exist. For example, in Fig. 5, the binary number recorded in the right-hand channel is 1101011010, whose decimal equivalent is 856. The message pulse train is represented by a graph 81 in Fig. 5, while synchronizing pulses are represented by graph 82 in Fig. 5, the amplitude of the pulses being understood to be represented by the magnetization of the material of tape 78. Heads 83 and 84 detect these variations in magnetization which may be characterized as pulses, and the electrical signal thus produced is amplified in amplifiers 85 and 86. The output of amplifier 85 is fed to step motor 87 which drives single-pole, multiple-throw switch 88 forward one terminal position for each wave length of signal on track 82. The terminals of switch 88 are connected to each of the stages of an electromechanical converter such as the one shown in Fig. 2. The output of amplifier 86 is fed through switch 88 as shown. The shaft output of this converter is then proportional to a decimal number corresponding to the digital number recorded upon tape 78.

Although this invention has been described and illustrated in detail, it is to be clearly understood that the same is by way of illustration and example only and is not to be take by way of limitation, the spirit and scope of this invention being limited only by the terms of the appended claims.

We claim:

1. Means for converting a binary number to a decimal number comprising a binary counter to store said binary number, a shaft, stepping means for advancing said shaft a number of discrete steps corresponding to the successive stages of said counter, gating means associated with each said stepping means, means responsive to the condition of said counter stages for activating said gating means, means energizing each said stepping means through said activated gating means successively in response to the condition of the associated counter stage, a gear train having a predetermined ratio driven by said shaft, and a revolution counter driven by said gear train whereby the numerical reading of said counter equals the decimal equivalent of the number stored in said counter.

2. A device as recited in claim 1 in which said energizing means comprises a single-pole multiple-throw switch for activating said gating devices successively to thereby accumulate on said counter the numerical content of successive stages of said counter.

3. Means for converting a binary number to a decimal number comprising a binary counter to store said binary number, a shaft, rotary driving means for turning said shaft, a plurality of gear means on said shaft, means responsively coupled to said binary counter for advancing said shaft a number of discrete steps corresponding to each stage of said counter, a plurality of gating means connected to energize said gear means, switching means connected to activate said gating means successively to thereby activate said gear means, a gear train having a predetermined ratio driven by said shaft, and a revolution counter driven by said gear train.

4. A binary to decimal converter comprising a binary counter having a binary number stored therein, a first shaft, rotary driving means for turning said shaft, a first gear rigidly attached to said shaft, a first pawl engaging said first gear to prevent said shaft from turning, a plurality of gears on said shaft and adapted to rotate around said shaft a number of successive steps corresponding to each stage of said counter, each said plurality of gears having a slot, the length of said slots corresponding to each stage of said counter, a second shaft attached to said first gear and extending through said slots, a plurality of pawls engaging said plurality of gears to prevent said gears from turning, a plurality of solenoid means responsive to each stage of said counter for causing said plurality of pawls to engage said plurality of gears in accordance with the condition of successive stages of said counter to prevent said plurality of gears from turning and for disengaging said first gear to permit said second shaft to turn in said slots, said first shaft turning in proportion to the distance said second shaft turns in said slots, a gear train having a predetermined ratio driven by said shaft, and a revolution counter driven by said gear train whereby the numerical reading of said counter equals the decimal equivalent of the binary number stored in said binary counter.

5. Means for adding in decimal form a plurality of numbers stored successively in a binary counter comprising shaft means, means responsively coupled to said binary counter for producing gear rotations successively proportional to the said binary numbers stored successively in said counter, and a revolution counter for registering a number proportional to said shaft rotation whereby numbers stored successively in said counter are added successively with their sum registering cumulatively on said revolution counter.

References Cited in the file of this patent

UNITED STATES PATENTS

| | | |
|---|---|---|
| 2,023,221 | Fischer et al. | Dec. 3, 1935 |
| 2,318,591 | Couffignal | May 11, 1943 |
| 2,533,242 | Gridley | Dec. 12, 1950 |
| 2,630,481 | Johnson | Mar. 3, 1953 |
| 2,630,552 | Johnson | Mar. 3, 1953 |
| 2,665,070 | Avery | Jan. 5, 1954 |
| 2,676,289 | Wulfsberg et al. | Apr. 20, 1954 |
| 2,761,620 | Lindesmith et al. | Sept. 4, 1956 |